US008979071B2

(12) United States Patent
Schumacher et al.

(10) Patent No.: US 8,979,071 B2
(45) Date of Patent: Mar. 17, 2015

(54) VIDEO JACK AND A METHOD OF OPERATION

(75) Inventors: Darren Schumacher, Ann Arbor, MI (US); Dennis Hanson, Medford, MN (US); Robert Kochie, Dodge Center, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 750 days.

(21) Appl. No.: 13/219,968

(22) Filed: Aug. 29, 2011

(65) Prior Publication Data

US 2013/0048931 A1 Feb. 28, 2013

(51) Int. Cl.

| | |
|---|---|
| ***B60P 1/48*** | (2006.01) |
| ***B66F 3/12*** | (2006.01) |
| ***B66F 3/25*** | (2006.01) |
| ***B66F 5/00*** | (2006.01) |

(52) U.S. Cl.

CPC ... *B66F 3/12* (2013.01); *B66F 3/25* (2013.01); *B66F 5/00* (2013.01)

USPC ................. 254/8 B; 254/1; 280/477; 280/511

(58) Field of Classification Search

USPC .............................. 254/1, 8 B; 280/477, 511

See application file for complete search history.

(56) References Cited

U.S. PATENT DOCUMENTS

| | | | | |
|---|---|---|---|---|
| 5,947,447 | A * | 9/1999 | Sorensen | 254/1 |
| 7,195,267 | B1 * | 3/2007 | Thompson | 280/477 |
| 8,262,120 | B1 * | 9/2012 | Pitts et al. | 280/477 |
| 2004/0094934 | A1 * | 5/2004 | Teague | 280/477 |
| 2006/0255560 | A1 * | 11/2006 | Dietz | 280/477 |

FOREIGN PATENT DOCUMENTS

| | | |
|---|---|---|
| CN | 201288048 | 8/2009 |
| JP | 3103419 | 10/2000 |
| WO | 0164574 | 9/2001 |

OTHER PUBLICATIONS

SPX Service Solutions; OTC Tool Manufacturer for Cars and Trucks; 2-Ton Service Jack; 3 pages; www.otctools.com.
OTC an SPX Brand; OTC Tool Manufacturer for Cars and Trucks; Video Inspection Scope; 2 pages; www.otctools.com.
European Search Report dated Nov. 26, 2012.

* cited by examiner

*Primary Examiner* — Lee D Wilson
*Assistant Examiner* — Shantese McDonald
(74) *Attorney, Agent, or Firm* — Baker & Hostetler LLP

(57) ABSTRACT

A vehicle lift jack is provided. The jack may include: a frame; a lifting arm attached to the frame; a saddle attached to an end of the lifting arm; and a video camera attached to the jack and oriented to capture video footage of an area proximate to the saddle. A method of lifting a vehicle using a jack may be provided. The method may include: positioning the jack under the vehicle; capturing an image of the vehicle; viewing the image; determining the jack is in a desired position with respect to the vehicle; and raising the vehicle with the jack.

19 Claims, 4 Drawing Sheets

VIDEO JACK AND A METHOD OF OPERATION

FIELD OF THE INVENTION

The present invention relates generally to jacks used to lift vehicles. More particularly, the present invention relates to a jack having a video camera associated with it to assist in positioning the jack.

BACKGROUND OF THE INVENTION

Vehicles such as cars and trucks require regularly scheduled maintenance. Many of the components that require maintenance or repair are located under the vehicle. In order to access these components, the vehicle is often lifted off of the ground in order to allow a technician to get under the vehicle to access the components. The jacks used to lift the vehicles are often hydraulic in order to generate the force required to lift the vehicle.

In some instances, the entire vehicle may not be lifted off the ground but only a portion of the vehicle such as the front or rear of the vehicle. In some instances, just one of the corners of the vehicles may be lifted off the ground. Because vehicles are made of several sensitive components, the vehicle jack must be placed in an appropriate manner in order to only contact a component such as the frame or other components of the vehicle that can withstand the forces of the jack lifting the vehicle.

Thus, a technician when desiring to lift all or part of a vehicle must take care to ensure that the vehicle and the jack are appropriately located with respect to each other before attempting to raise the vehicle. In order to ensure that the jack and the vehicle are aligned in a desired manner, the technicians often must bend down and look under the vehicle in order to see how the vehicle and the jack are positioned with respect to each other.

In some instances, it may be difficult to verify the relative positions of the vehicle and the jack due to the fact that it may be dark under the vehicle and it may be awkward for the technician to bend down and get a good view of the relative positions of the jack and vehicle. In some instances, the technician's vision may be obstructed by portions of the vehicle.

In instances where there technician is using a portable service jack, if the jack and the vehicle are not properly positioned with respect to each other, the technician will simply move the jack to another location or adjust the location of the jack. However, these minor adjustments of the location of the jack still require that the technician bend down and look under the vehicle to ensure the jack is in the correct location. Therefore, it would be desirable to have a method or apparatus that can assist the technician in ensuring that the jack is properly located with respect to the vehicle.

SUMMARY OF THE INVENTION

The foregoing needs are met, to a great extent, by some embodiments in accordance with the present invention, wherein in one aspect an apparatus is provided that in some embodiments a method or apparatus is provided to assist an operator in positioning a jack with respect to a vehicle.

In accordance with one embodiment of the present invention, a vehicle lift jack is provided. The jack may include: a frame; a lifting arm attached to the frame; a saddle attached to an end of the lifting arm; and a video camera attached to the jack and oriented to capture video footage of an area proximate to the saddle.

In accordance with another embodiment of the present invention, a vehicle lift jack may be provided. The vehicle jack may include: a frame; a lifting arm attached to the frame; a saddle attached to an end of the lifting arm; and a means for capturing an image attached to the jack and oriented to capture an image of an area proximate to the saddle.

In accordance with yet another embodiment of the present invention, A method of lifting a vehicle using a jack may be provided. The method may include: positioning the jack under the vehicle; capturing an image of the vehicle; viewing the image; determining the jack is in a desired position with respect to the vehicle; and raising the vehicle with the jack.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
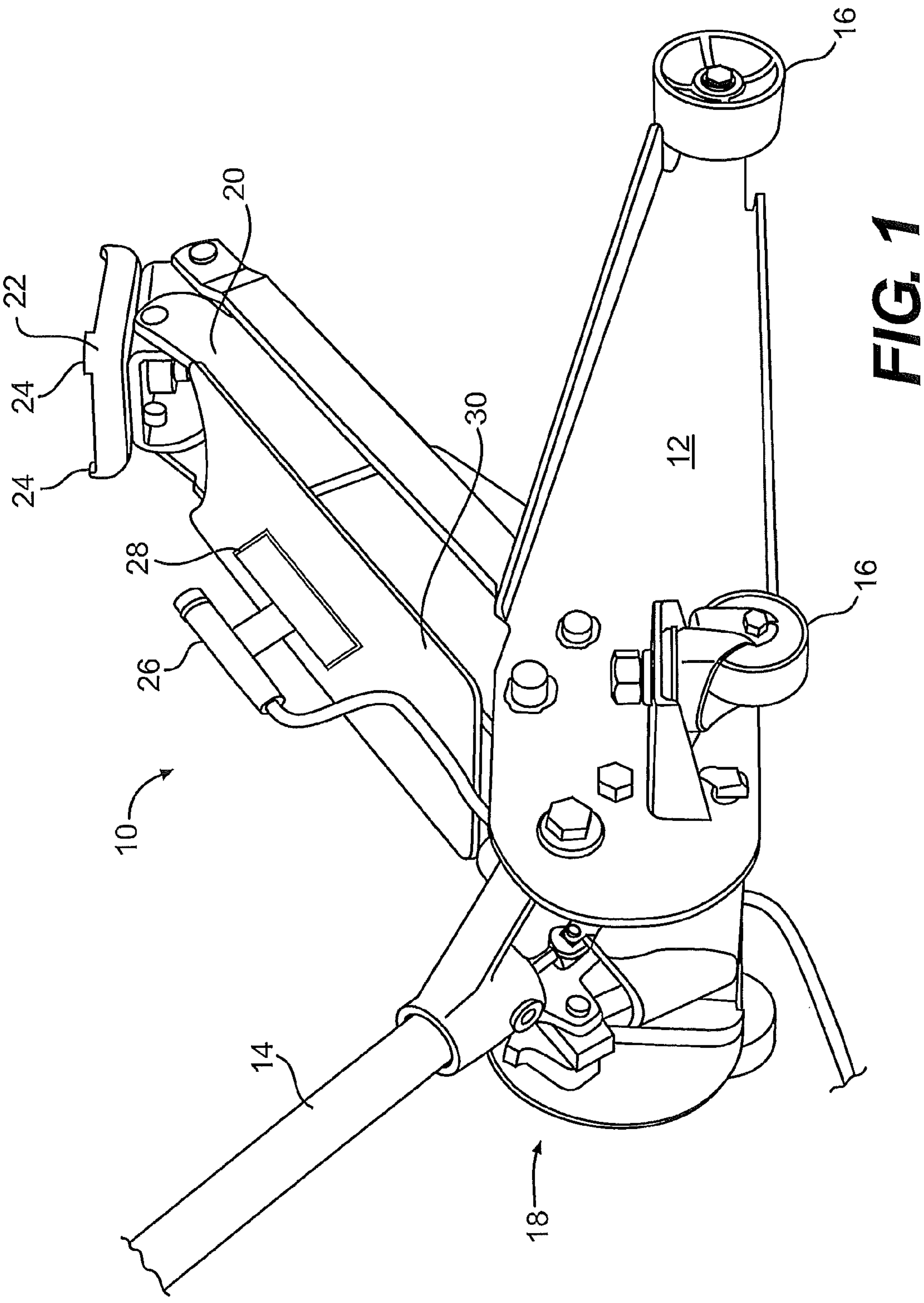
FIG. 1 is a perspective view illustrating an embodiment of a vehicle jack and a video recorder in accordance with an embodiment of the invention.

The invention will now be described with reference to the drawing figures, in which like reference numerals refer to like parts throughout. An embodiment in accordance with the present invention provides a jack having a video scope monitor to provide an image for the operator to determine if a jack is in a desired position with respect to a vehicle.

FIG. 1 is perspective view of a jack 10 in accordance with an embodiment of the invention. Many aspects of the jack 10 are common among typical service jacks commonly available with the exception of the addition of the video camera 26 and the associated parts which will be described in detail. Because most of the mechanical aspects of the jack 10 are generally known they will only be described briefly and will not be described in detail.

An example of a jack 10 that may be modified and used is sold as the Floor Boss™ and listed in the OTC catalogue from SPX Service Solutions at 655 Eisenhower Drive Owatonna, Minn. as part no. 1525. The jack 10 includes a frame 12 and a handle 14. Wheels 16 are attached to the frame 12 which allow the jack 10 to be moved. Often, the jack 10 is moved by an operator by manipulating the handle 14. The jack 10 includes a lifting mechanism 18 which, in some embodiments, maybe a hydraulic mechanism. In other embodiments, the lifting mechanism 18 maybe mechanical.

The lifting mechanism 18 includes a lifting arm 20. At one end of the lifting arm 20 is a saddle 22. The saddle 22 is the portion of the jack 10 that contacts the vehicle (not shown) as the lifting arm 20 is raised in some embodiments of the invention. The saddle 22 may include castlagated sides 24. However, other embodiments of the invention may include a saddle 22 that may or may not include castlagated sides 24. The lifting mechanism 18 maybe actuated by moving the handle 14 as is well known in the art.

The jack 10 includes a video camera 26. The video camera 26 is attached to the jack 10 by a video camera mount 28. In some embodiments of the invention, the video camera mount 28 maybe a permanent type mount that allows the video camera 26 to be mounted or bolted by fasteners to the jack 10. In the embodiment shown in FIG. 1, the video camera mount 28 is attached to the lifting arm 20. However, in other embodiments of the invention, the video camera mount 28 maybe attached to other features of the jack 10, such as the frame 12 or any other suitable part of the jack 10.

The video camera 26 is oriented so that it will capture an image proximate to the saddle 22. In some instances, the video camera 26 will capture at least part of or, in some instances, all of the saddle 22. By viewing the saddle 22 and a portion of the vehicle, an operator can determine if the jack 10 is in a desirable position before the operator actuates the lifting mechanism 18.

In some embodiments the operator may partially lift the lifting mechanism 18 so that the lifting arm 20 is just below an undercarriage of a vehicle and wait to do the final actuation of lifting mechanism 18 until after the operator has confirmed that the saddle 22 is in a desired location.

In another embodiments of the invention, the camera mount 28 maybe a flexible mount 28. A flexible mount 28 will permit the operator or technician to adjust a position of the video camera 26 in order to capture whatever images the technician is interested in viewing.

In the embodiment of the invention shown in FIG. 1, the video camera 26 includes a video camera cord 30. The video camera cord 30 will attach the video camera 26 to a device which will allow the operator to view the images captured by the video camera 26 and will be discussed further later below.

Figure 2:
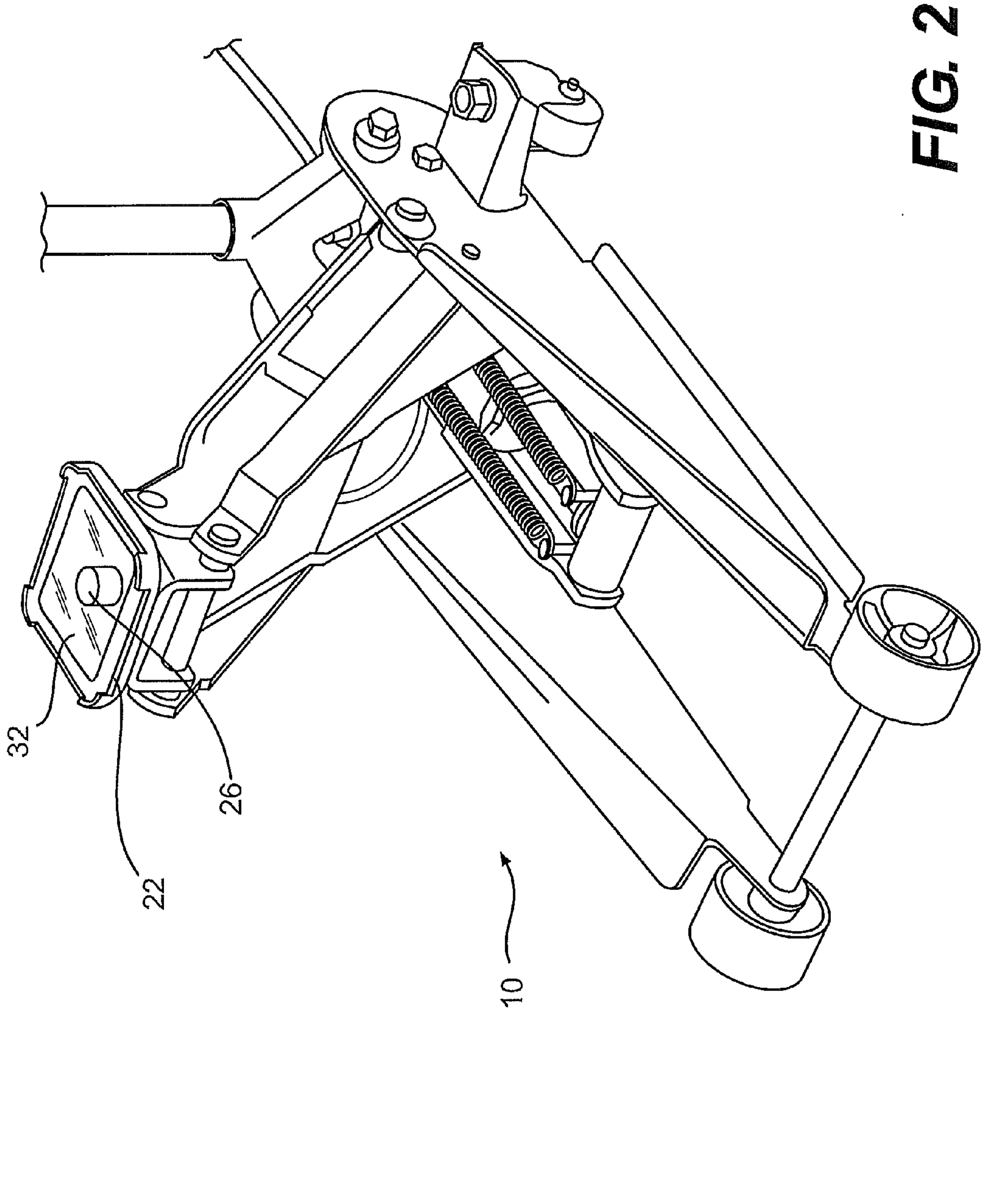
FIG. 2 is a perspective view of another embodiment including a vehicle jack and a video recorder.

FIG. 2 is a perspective view of another embodiment in accordance with the invention. The jack 10 shown in FIG. 2 is similar to the jack 10 shown in FIG. 1. However, the location of the video camera 26 is different. The video camera 26 is located in a bottom portion of the saddle 22. The video camera 26 is oriented to substantially point straight up such that the video camera 26 captures an image of what is immediately above the saddle 22. The video camera 26 is located behind a camera protector plate 32. The camera protector plate 32 maybe made of a transparent material such as fiberglass, Plexiglas or any other transparent type of material that will provide protection to the video camera 26.

As evident from FIG. 1 and FIG. 2, one of ordinary skill and art can determine that the location of the video camera 26 is not critical to the invention and several embodiments in accordance with the invention may have the video camera 26 located at different locations on the jack 10. However, in accordance with some embodiments of the invention, the video camera 26 is oriented so that it will capture footage of an image of where the saddle 22 will contact the undercarriage of the vehicle so that the operator can ensure that the jack 10 is engaging the correct portion of the undercarriage of the vehicle.

Figure 3:
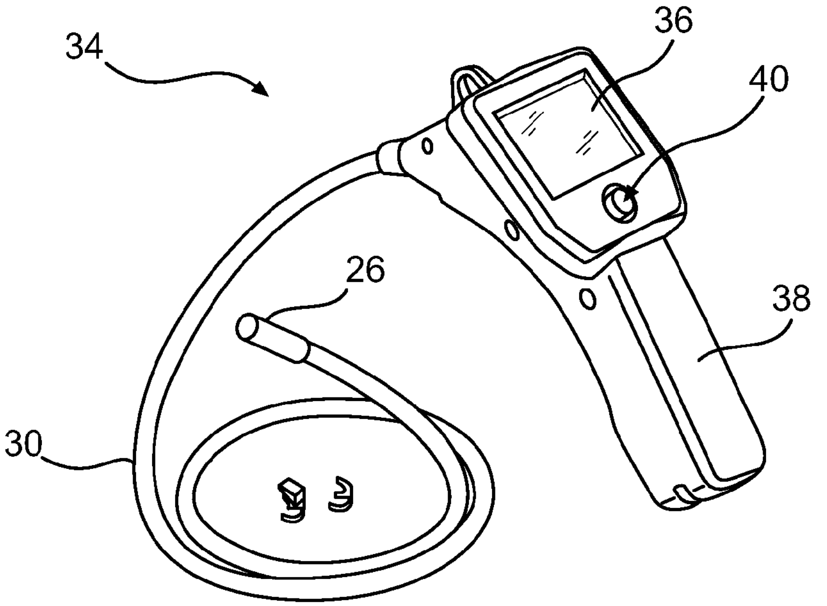
FIG. 3 is a perspective view a video scope in accordance with an embodiment of the invention.

FIG. 3 is an example of a video scope 34 that maybe used in accordance with the invention. The video scope 34 shown in FIG. 3 is commonly available on the market.

For example the video scope 34 may be used that is sold under the OTC brand and identified in the OTC catalogue as part no. 3880 printed by SPX Service Solutions at 655 Eisenhower Drive, Owatonna, Minn. Other video scopes may also be used in accordance with the invention.

The video scope 34 may include a screen 36 which shows the images captured by the video camera 26. The video camera 26 is connected to the screen 36 by a cord 30. The video scope 34 includes a hand held unit 38 with controls 40 to operate the screen 36. The controls 40 may include a zoom in or zoom out feature as well as an on/off feature. The control, 40 may also control the video camera 26 and/or screen 36 to operate under low light or normal conditions and may adjust the focus or any other features of the camera 26 that are desired to be adjusted in order to clarify the image displayed on the screen 36.

Figure 4:
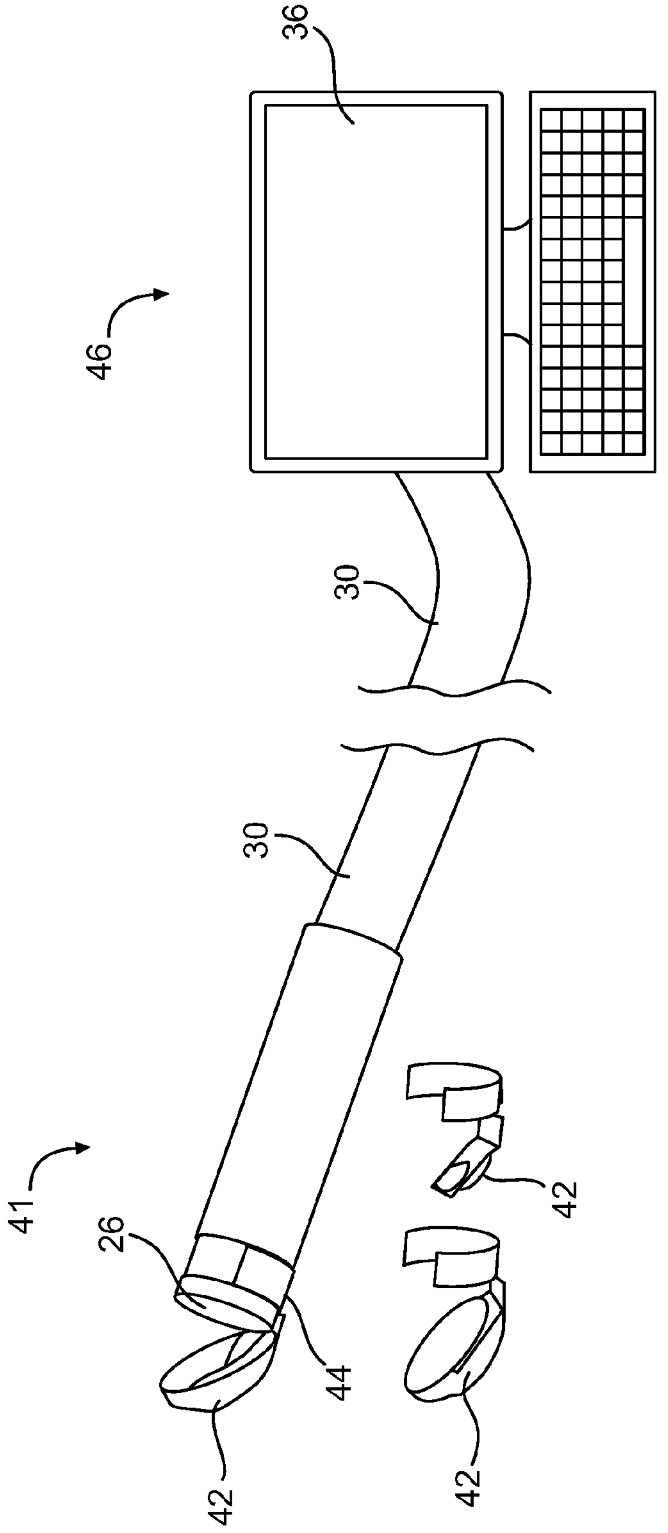
FIG. 4 is another embodiment of a video scope connected to a computer in accordance of an embodiment of the invention.

FIG. 4 is a schematic diagram of a camera system 41 that maybe mounted onto a jack 10 in accordance to another embodiment of the invention. The camera 26 includes a reflector 42 so that the lens portion of the camera 26 does not directly point at the feature to be captured. However, the reflector 42 allows the image desired to recorded to be presented to the video camera 26. Such an embodiment maybe useful when the features of the undercarriage of the vehicle to be recorded are in a difficult to locate position, or are obstructed by portions of the vehicle.

The reflector 42 maybe attached to the video camera 26 by a reflector clip 44. Other reflectors 42 maybe switched out to provide various fields of view or other images to be reflected to the video camera 26.

As shown, the video camera 26 is connect to a computer 46. The computer 46 may include a screen 36. The computer 46 may save the images received by signal from the camera 26. While the embodiments shown in FIG. 3 and FIG. 4 show a video camera cord 30 connecting the video camera 26 to the screen 36, one with ordinary skill and the art will appreciate that some embodiments of the invention the video camera 26 may transmit by a wireless connection to the hand held unit 38 shown is FIG. 3 or to the computer 46 as shown in FIG. 4.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle lift jack comprising:

a frame;

a lifting arm attached to the frame;

a saddle attached to an end of the lifting arm; and a video camera attached to the jack and oriented to capture video footage of an area proximate to the saddle, wherein the saddle has a lower section encompassed by an upper section and the video camera is located in the lower section.

2. The jack of claim 1, further comprising a transparent plate covering the video camera.

3. The jack of claim 2, wherein the video camera is oriented to capture video footage through the transparent plate.

4. The jack of claim 2, wherein the transparent plate is Plexiglas.

5. The jack of claim 1, wherein the video camera is mounted to the arm.

6. The jack of claim 5, wherein the video camera is oriented to capture video footage of at least part of the saddle.

7. The jack of claim 1, wherein the video camera is mounted to the jack with a mount and the mount is a flexible mount.

8. The jack of claim 1, wherein the video camera generates a signal that is sent to a screen.

9. The jack of claim 8, wherein the signal is sent to the screen via a wire.

10. The jack of claim 8, wherein the signal is sent to the screen via a wireless connection.

11. The jack of claim 1, wherein the video camera generates a signal that is sent to a computer.

12. The jack of claim 11, wherein the computer saves the signal.

13. The jack of claim 1, further comprising wheels attached to the frame.

14. The jack of claim 1, further comprising a reflector oriented to reflect an image to the camera.

15. A method of lifting a vehicle using a jack comprising:

positioning the jack under the vehicle;

capturing an image of the vehicle with a camera that is located in a lower section of a saddle, the lower section is encompassed by an upper section of the saddle, and the saddle being attached to a lifting arm of the jack;

viewing the image on a screen;

determining the jack is in a desired position with respect to the vehicle; and raising the vehicle with the jack.

16. The method of claim 15, further comprising saving the image on a computer.

17. The method of claim 15, further comprising moving the jack if the viewed image indicates that the jack is not in a desired position with respect to the vehicle.

18. The method of claim 15, wherein the image includes the vehicle and the jack.

19. A vehicle lift jack comprising:

a frame;

a lifting arm attached to the frame;

a saddle attached to an end of the lifting arm; and means for capturing an image attached to the jack and oriented to capture an image of an area proximate to the saddle, wherein the saddle has a lower section encompassed by an upper section and the video camera is located in the lower section.

* * * * *